(12) United States Patent
Choi et al.

(10) Patent No.: US 11,099,361 B2
(45) Date of Patent: Aug. 24, 2021

(54) SMALL LENS SYSTEM COMPRISING FIVE LENSES OF +—+ REFRACTIVE POWERS

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Seung Nam Nam, Gyeonggi-do (KR); Sung Nyun Kim, Incheon (KR)

(73) Assignee: SEKONIX CO., LTD.

( * ) Notice: Subject to any disclaimer, the term of this patent is extended or adjusted under 35 U.S.C. 154(b) by 190 days.

(21) Appl. No.: 16/576,247

(22) Filed: Sep. 19, 2019

(65) Prior Publication Data
US 2020/0379218 A1  Dec. 3, 2020

(30) Foreign Application Priority Data

May 30, 2019 (KR) .................. 10-2019-0063675

(51) Int. Cl.
  *G02B 13/00* (2006.01)
  *G02B 9/60* (2006.01)
(52) U.S. Cl.
  CPC .......... *G02B 13/0045* (2013.01); *G02B 9/60* (2013.01)

(58) Field of Classification Search
  CPC .............................. G02B 13/0045; G02B 9/60
  See application file for complete search history.

(56) References Cited

U.S. PATENT DOCUMENTS

2021/0109322 A1 * 4/2021 Yuza .................. G02B 13/0045

* cited by examiner

*Primary Examiner* — Wen Huang
(74) *Attorney, Agent, or Firm* — Mendelsohn Dunleavy, P.C.

(57) ABSTRACT

A small lens system having five lenses arranged along an optical axis from a focal object side in order of a first, a second, a third, a fourth, and a fifth lens is proposed. A center interval ($T_{12c}$) of the first and the second lens is $T_{12c}<0.2$ mm, and an effective outermost interval ($T_{12e}$) satisfies $T_{12e}<0.2$ mm. The fifth lens has a positive refractive power, a front surface convex toward the focal object, a rear curvature (C10) satisfying $-0.01<C10<0.01$, and the periphery of a rear surface convex upwards. A center interval ($T_{45c}$) of the fourth and the fifth lens is $T_{45c}<0.1$ mm and an effective outermost distance (T45e) thereof satisfies T45e>0.35 mm. Thicknesses of each lens from the first to the fifth lens and a distance (TL) from the front to the rear surface of the lens system satisfy (ct1+ct2+ct3+ct4+ct5)/TL<0.47.

15 Claims, 11 Drawing Sheets

PRIOR ART

SMALL LENS SYSTEM COMPRISING FIVE LENSES OF +−−−+ REFRACTIVE POWERS

CROSS REFERENCE TO RELATED APPLICATION

The present application claims priority to Korean Patent Application No. 10-2019-0063675, filed May 30, 2019, the entire contents of which is incorporated herein for all purposes by this reference.

BACKGROUND OF THE INVENTION

Field of the Invention

The present invention relates generally to a wide-angle lens system. More particularly, the present invention relates to a small lens system, which includes a total of five lenses, in particular by properly designing a refractive power, shape, and the like of lenses, it is possible to realize lightness and smallness of the lens system and efficient correction of distortion, thereby providing an image with high-resolution.

Description of the Related Art

Recently, portable terminals are equipped with a camera to enable making video calls and taking photographs. Furthermore, the more functions provided by the camera in the portable terminal, the more the increase in demand for the high resolution and the wide-angle of the camera for the portable terminal. In addition, the miniaturization of such devices for easy portability has become a trend.

In order to realize such a function having high resolution, high performance, and miniaturization, the camera lens is made of a plastic material lighter than glass these days, and the lens system is composed of five or more lenses for high resolution.

Due to the limitations of smartphone thickness, the shorter the total track length of the lens system, the more advantageous for small lenses, particularly those mounted on a smartphone.

As shown in FIG. 1, the U.S. Pat. No. 9,864,195B lens system is composed of a total of five lenses, satisfying $(ct1+ct2+ct3+ct4+ct5)/TL=0.5$ or more, wherein ct1 is the thickness of a first lens, ct2 is the thickness of a second lens, ct3 is the thickness of a third lens, ct4 is the thickness of a fourth lens, ct5 is the thickness of a fifth lens, and TL is the distance from the front of the first lens to the rear of the fifth lens.

In addition, the effective focal length f of the lens system, the distance TTL from the front surface to the image surface of the lens system satisfy that TTL/f is 0.87 or more.

In other word, the ratio of the sum of the thickness of the lenses to the distance from the front surface to the rear surface of the lens has 0.5 or more. Since the distance from the front surface of the lens system to the image surface relative to the effective focal length of the lens system is 0.87 or more, the length of the entire lens system is long, leading to a limitation to applying the lens system to a thin smartphone.

SUMMARY OF THE INVENTION

Accordingly, the present invention has been made keeping in mind the above problems occurring in the related art, and the present invention is intended to propose a small lens system in which the refractive power, shape and the like of lenses are properly designed, thus realizing lightness and smallness and enabling efficient correction of distortion, and thereby providing an image with high-resolution and minimizing the length of the entire lens system.

In order to achieve the above objective, according to one aspect of the present invention, there is provided a small lens system having a plurality of lenses arranged along an optical axis from a focal object side in order of a first lens L1, a second lens L2, a third lens L3, a fourth lens L4, and a fifth lens L5. The small lens system includes: the first lens L1, wherein the first lens L1 has a positive refractive power and a front surface of the first lens is convex toward the focal object side; the second lens L2, wherein the second lens L2 has a negative refractive power, a rear surface of the second lens L2 is concave toward an image side, the center interval T12c of the first lens and the second lens satisfies T12c<0.2 mm, and the outermost interval T12e of the effective diameter of the first lens and the second lens satisfies T12e<0.2 mm; the third lens L3, wherein the third lens L3 has a negative refractive power, and is biconcave; the fourth lens L4, wherein the fourth lens L4 has a negative refractive power, the front surface of the fourth lens L4 is concave toward the focal object side, and a rear surface is convex toward the image side; and the fifth lens L5, wherein the fifth lens L5 has a positive refractive power, a front surface of the fifth lens L5 is convex toward the focal object side, a curvature of a rear surface C10 satisfies −0.01<C10<0.01, the periphery of the rear surface is convex toward the image side, the center interval T45c of the fourth lens and the fifth lens satisfies T45c<0.1 mm, the outermost interval T45e of the effective diameter of the fourth lens and the fifth lens satisfies T45e>0.35 mm, and the value of the thickness ct1 of the first lens, the thickness ct2 of the second lens, the thickness ct3 of the third lens, the thickness ct4 of the four lenses, the thickness ct5 of the fifth lens, and the distance TL from the front surface of the first lens to the rear surface of the fifth lens satisfy $(ct1+ct2+ct3+ct4+ct5)/TL<0.47$.

In addition, the distance T47 from the rear surface of the second lens to the front surface of the fourth lens may satisfy T47>2.5 mm.

In addition, the effective focal length f of the lens system, and the distance TTL from the front surface of the lens system to the image surface may satisfy TTL/f<0.85.

In addition, an angle of view VA may satisfy 26 degrees<VA<32 degrees.

In addition, the composite focal length f12 of the first lens L1 and the second lens L2, and the composite focal length f345 of the third lens L3, the fourth lens L4, and the fifth lens L5 may satisfy 0.8<|f12/f345|<1.2.

In addition, an Abbe number V1 of the first lens L1, an Abbe number V2 of the second lens L2, an Abbe number V3 of the third lens L3, an Abbe number V4 of L4 of the fourth lens, and an Abbe number V5 of the fifth lens L5 may respectively satisfy 50<V1<60, 15<V2<30, 50<V3<60, 50<V4<60, and 15<V5<30.

In addition, all of the first to fifth lenses may be made of a plastic material and all surfaces may be aspherical.

As described above, the present invention provides a lens system having a plurality of lenses arranged along an optical axis from a focal object side in order of a first lens, a second lens, a third lens, a fourth lens, a fifth lens, and a sixth lens. The lens system realizes lightness and smallness and enables efficient correction of distortion, thereby having an effect that provides a small lens system capable of providing a high resolution image.

In particular, the sum of the thicknesses of the lenses relative to the distance TL from the front surface of the first lens to the rear surface of the last lens is less than ½, and the distance TTL from the front surface of the lens system to the image surface relative to the effective focal length of the lens system is less than 0.85. Thus, it is possible to provide a short lens system, which has an effect that can be easily applied to a thin or small camera module, particularly a smartphone.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The present invention relates to a lens system having a plurality of lenses arranged along an optical axis from a focal object side in order of a first lens, a second lens, a third lens, a fourth lens, and a fifth lens.

In addition, by appropriately designing the refractive power of the lenses, shape, and etc., the lens system realizes lightness and smallness and enables efficient correction of distortion, thereby providing an image with high-resolution.

In particular, the sum of the thicknesses of the lenses relative to the distance TL from the front surface of the first lens to the rear surface of the last lens is less than ½, and the distance TTL from the front surface of the lens system to the image surface relative to the effective focal length of the lens system is less than 0.85. Thus, it is possible to provide a short lens system, which has an effect that may be easily applied to a thin or small camera module, especially a smartphone.

Figure 1:
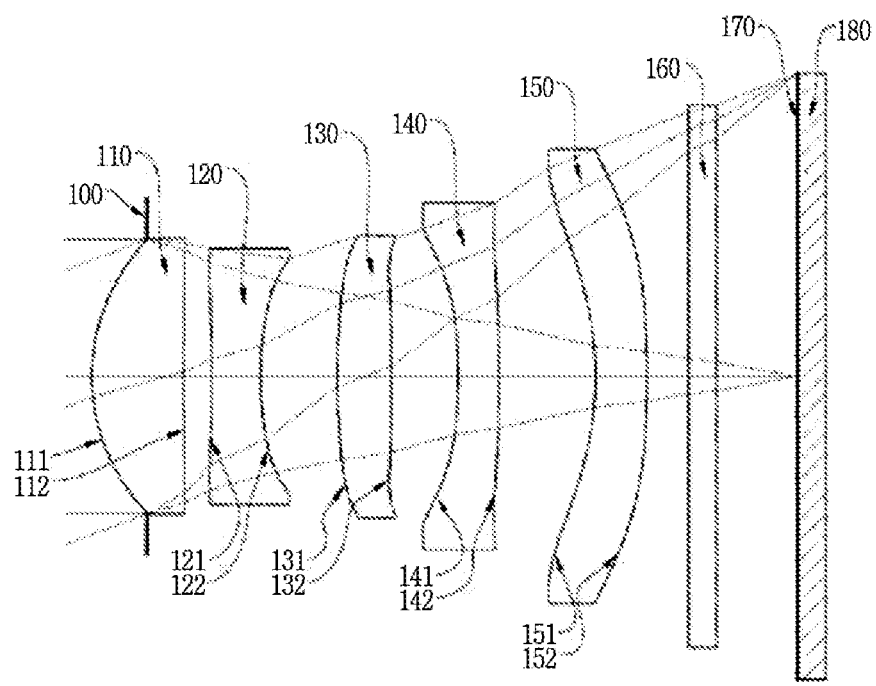
FIG. 1 is a schematic diagram of a small lens system in the related art.
Figure 2:
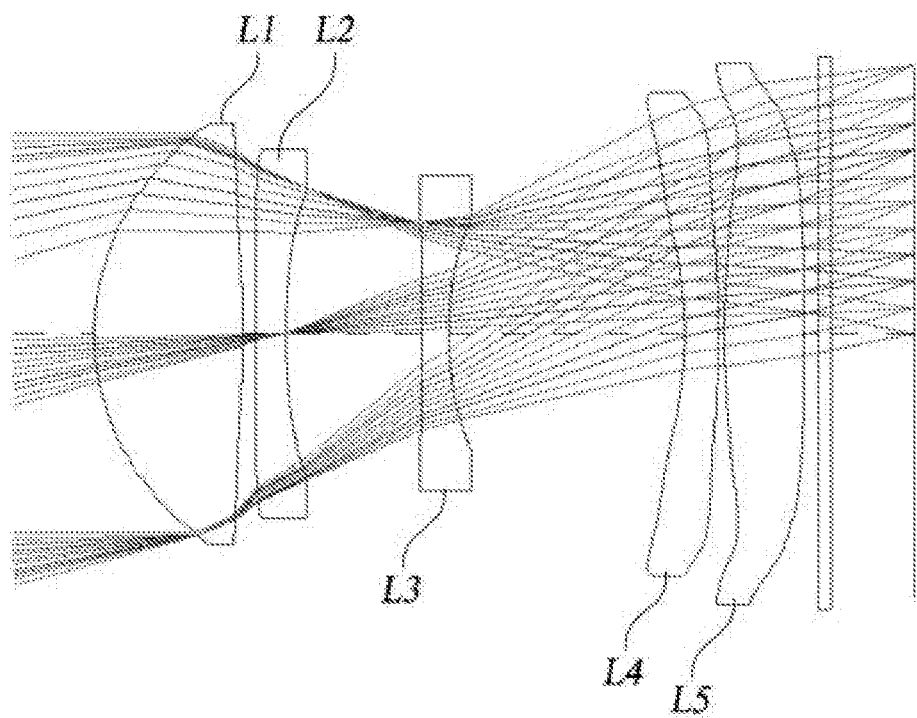
FIG. 2 is a diagram showing a first exemplary embodiment of the small lens system according to the present invention.
Figure 3:
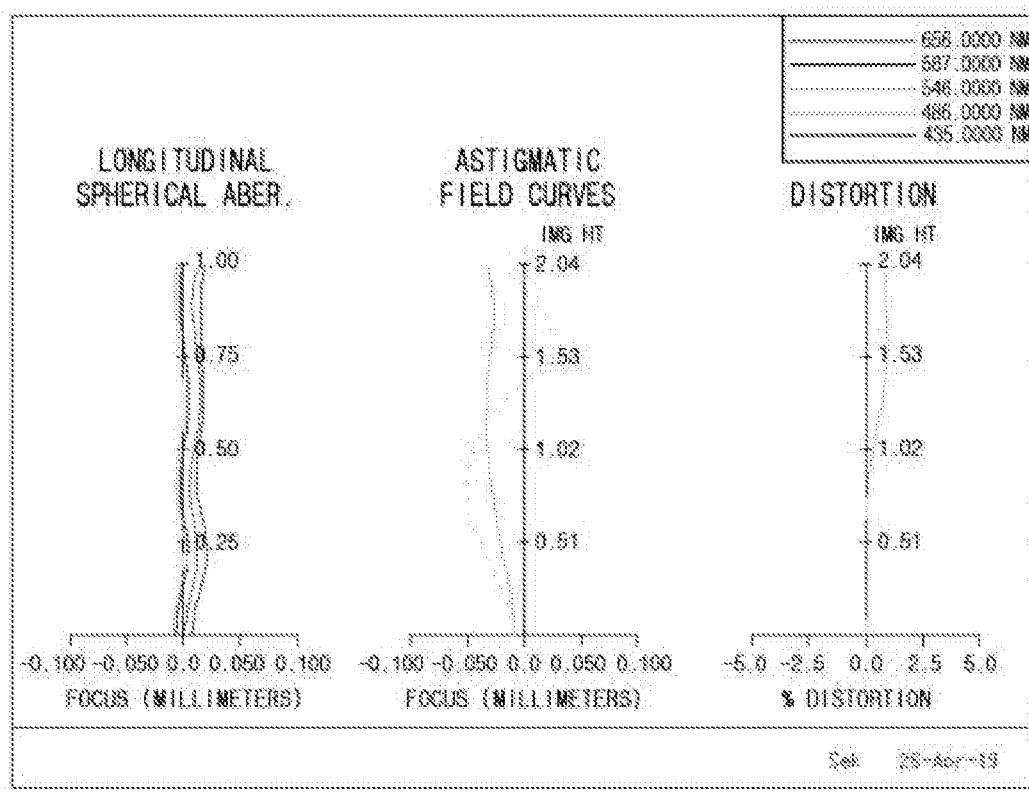
FIG. 3 is an aberrational diagram according to the first exemplary embodiment of the present invention.
Figure 4:
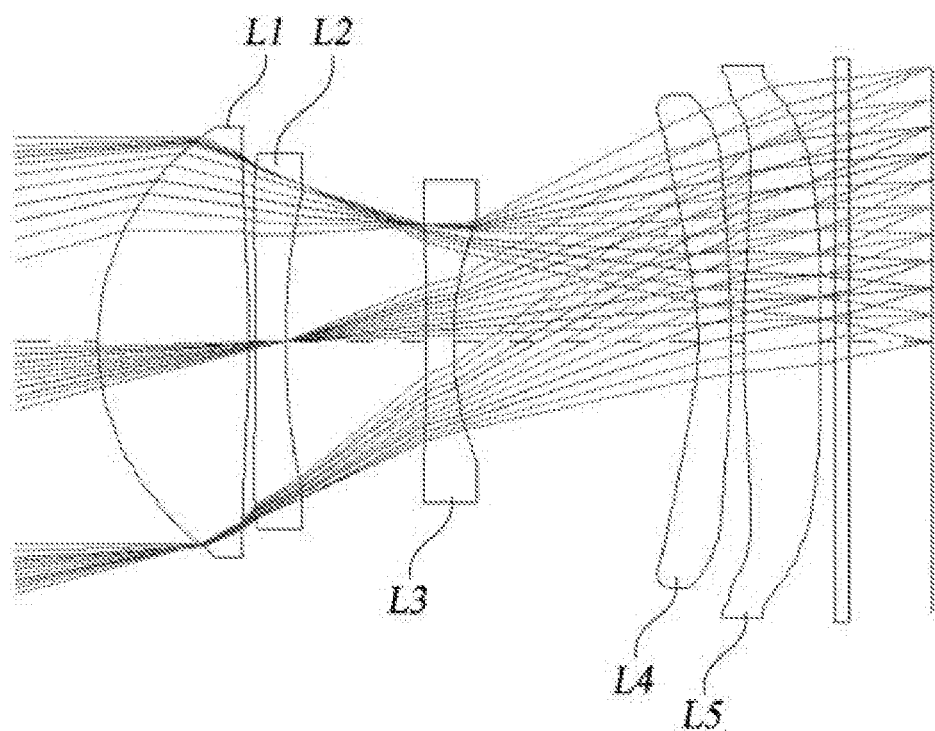
FIG. 4 is a diagram showing a second exemplary embodiment of the small lens system according to the present invention.
Figure 5:
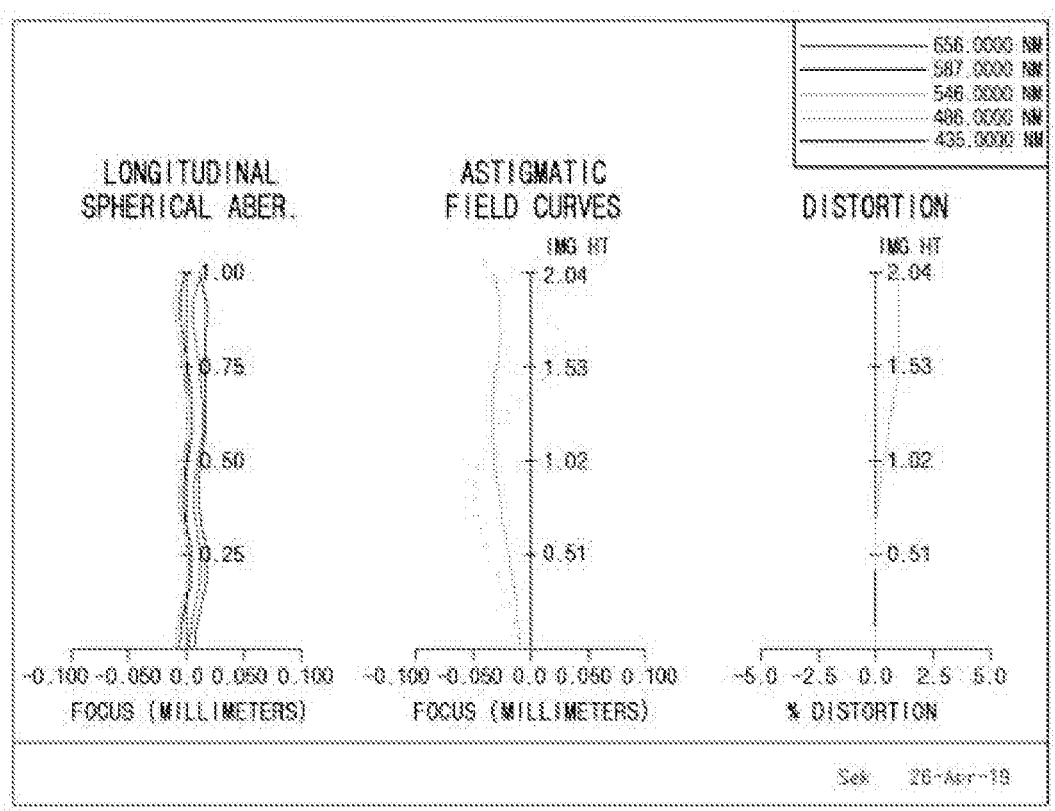
FIG. 5 is an aberrational diagram according to the second exemplary embodiment of the present invention.
Figure 6:
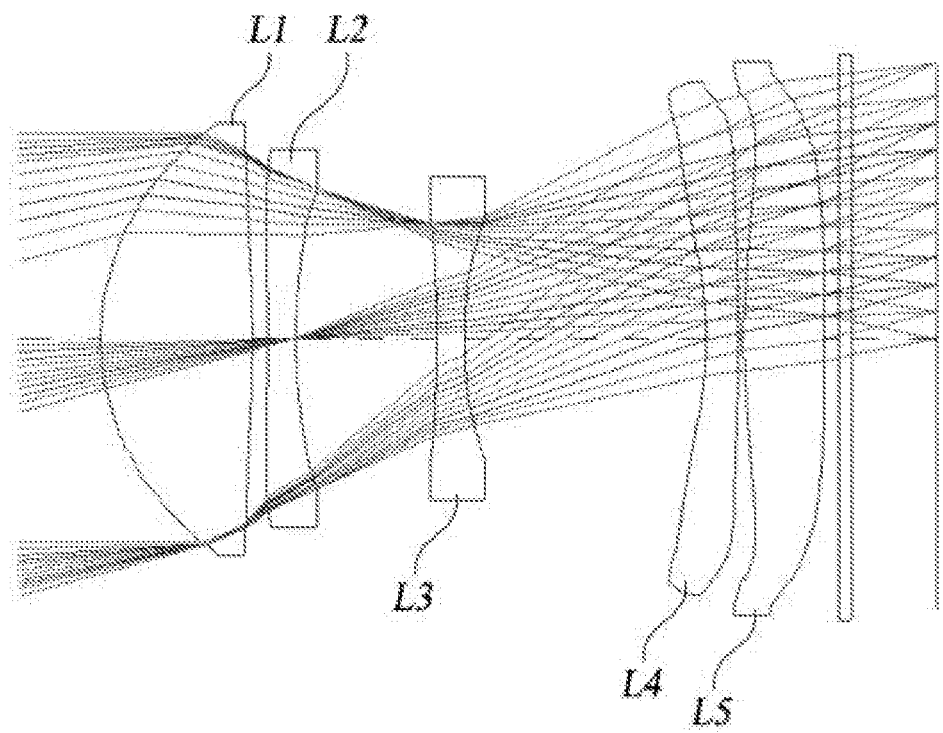
FIG. 6 is a diagram showing a third exemplary embodiment of the small lens system according to the present invention.
Figure 7:
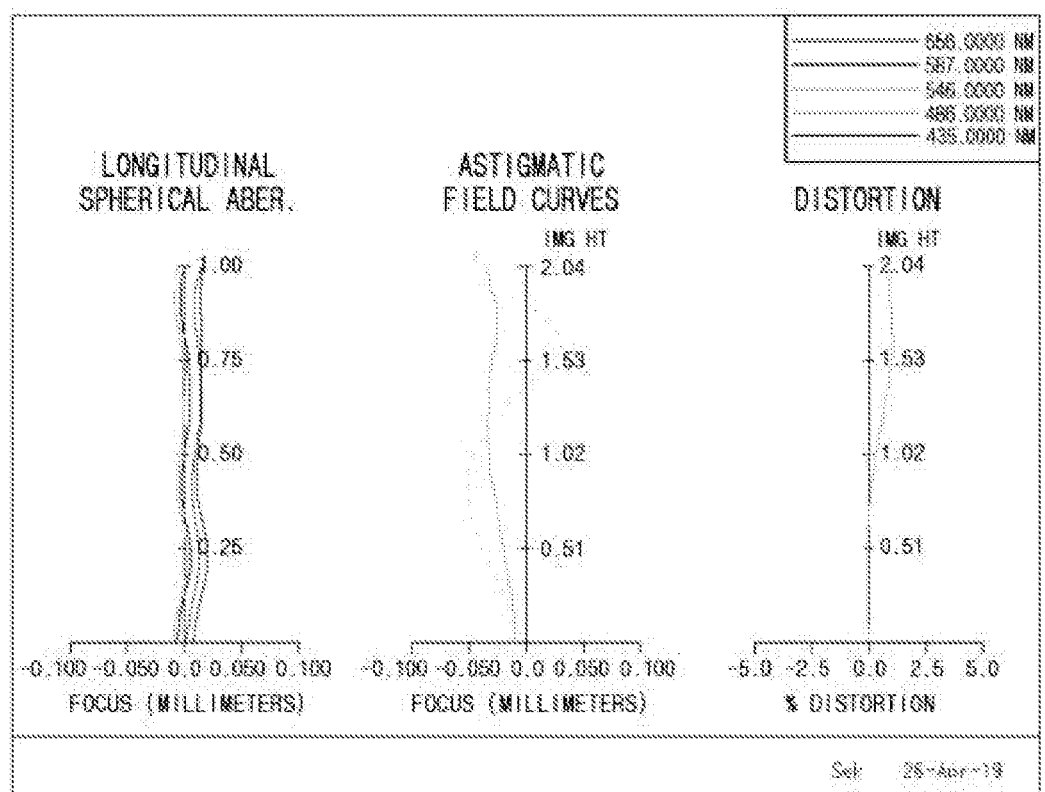
FIG. 7 is an aberrational diagram according to the third exemplary embodiment of the present invention.
Figure 8:
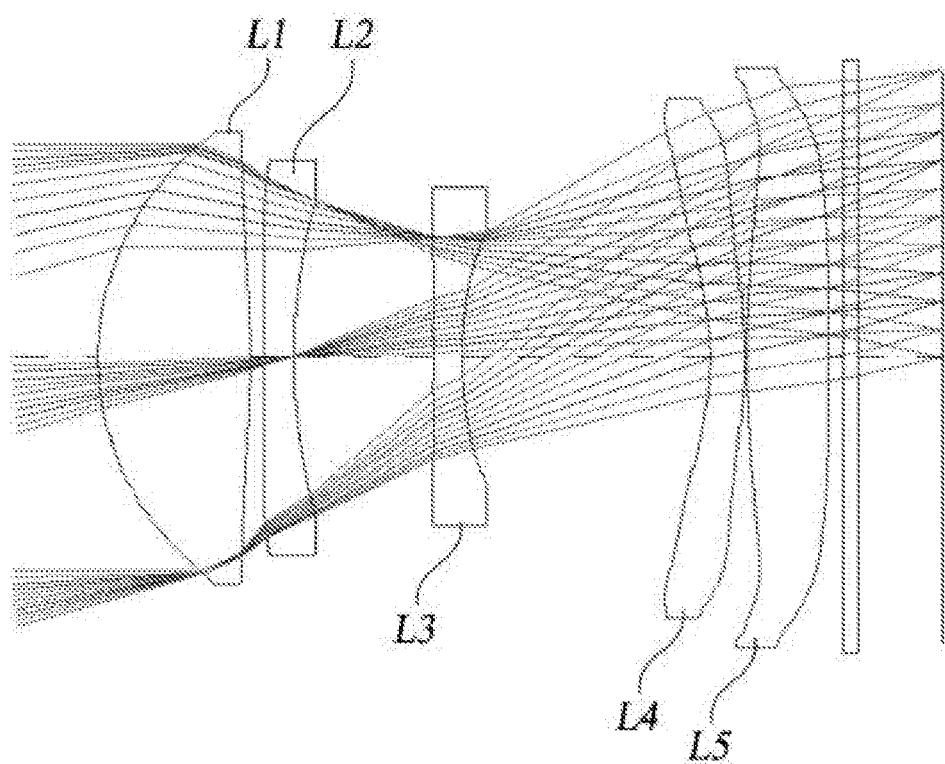
FIG. 8 is a diagram showing a fourth exemplary embodiment of the small lens system according to the present invention.
Figure 9:
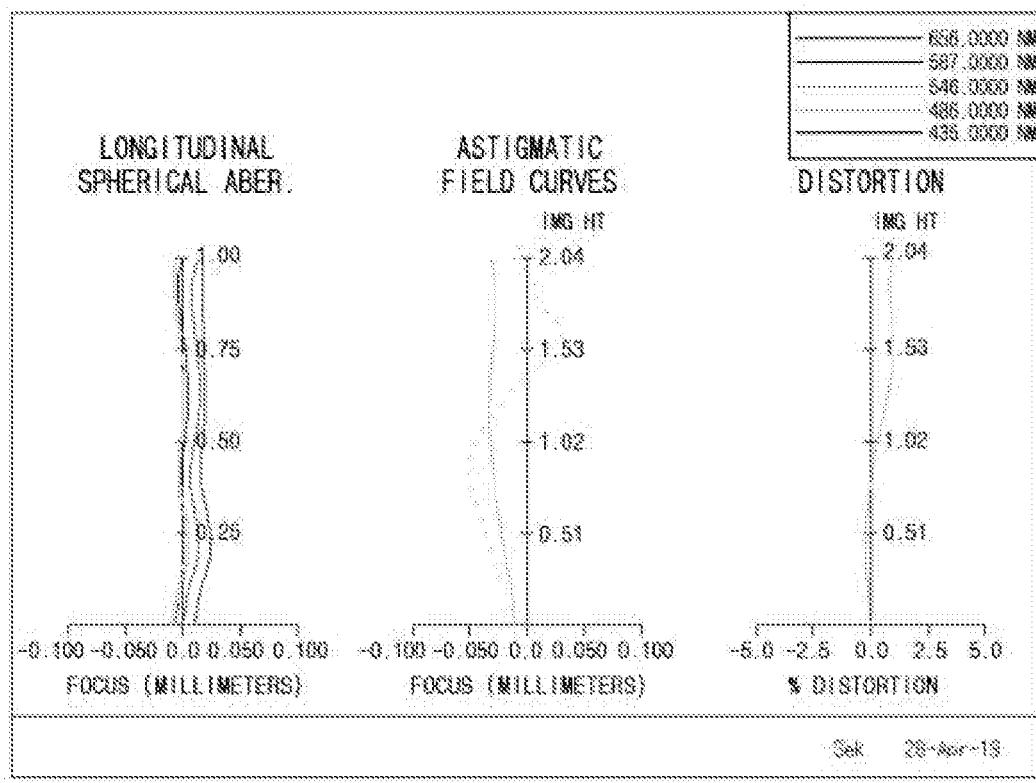
FIG. 9 is an aberrational diagram according to the fourth exemplary embodiment of the present invention.
Figure 10:
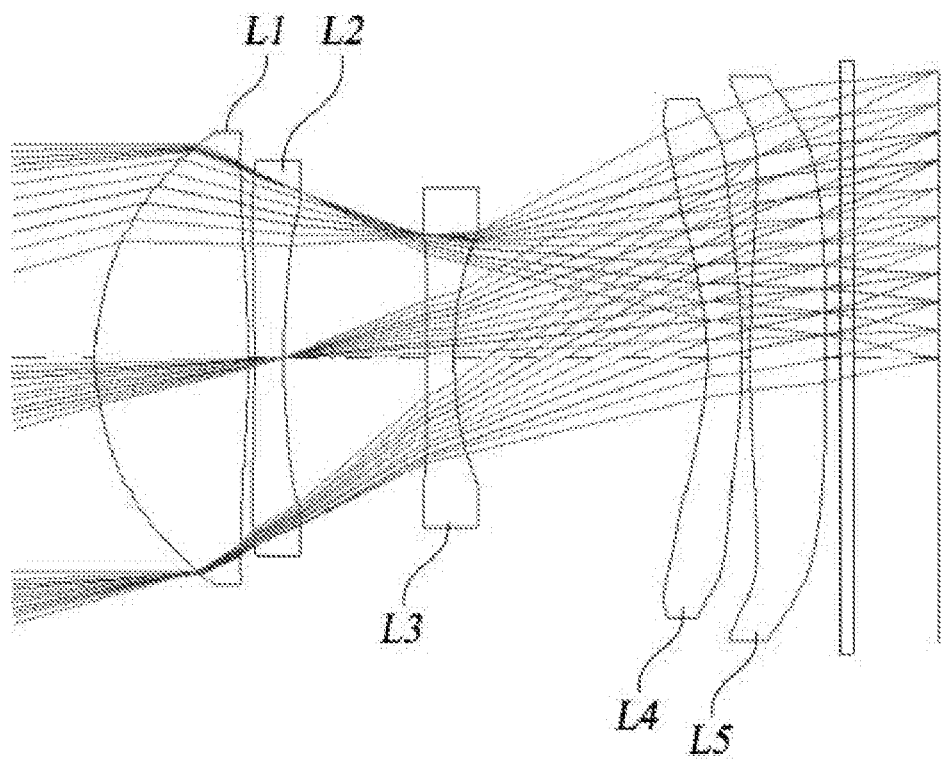
FIG. 10 is a diagram showing a fifth exemplary embodiment of the small lens system according to the present invention.
Figure 11:
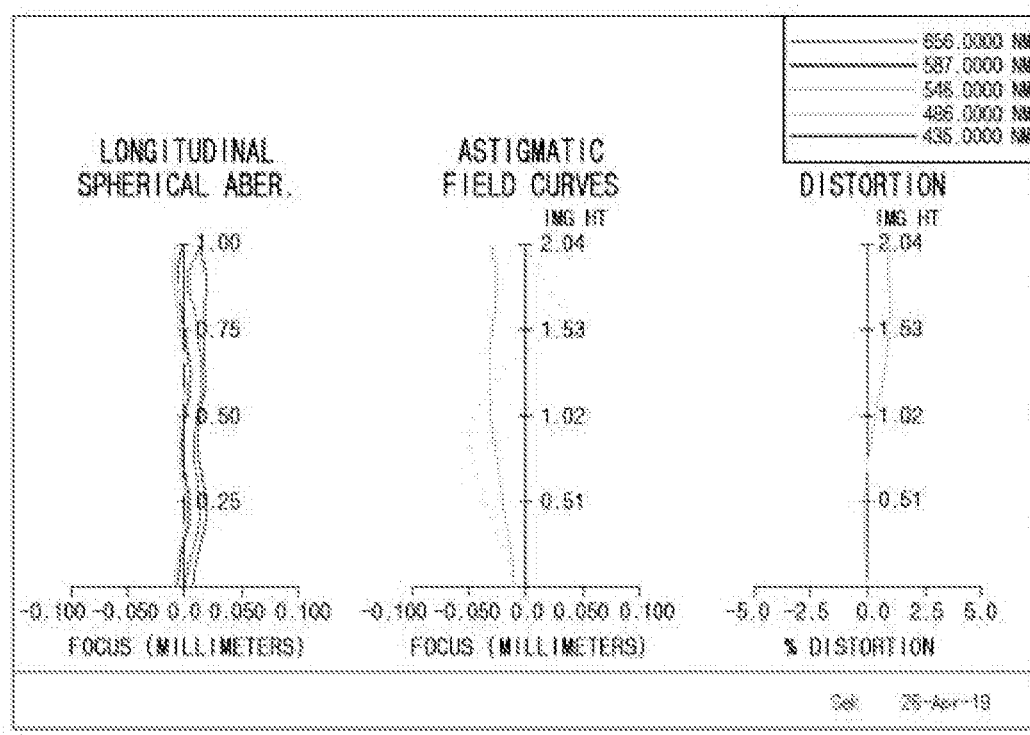
FIG. 11 is an aberrational diagram according to the fifth exemplary embodiment of the present invention.

Hereinafter, with reference to the accompanying drawings, the present invention will be described in detail. FIG. 2 shows a diagram illustrating a first exemplary embodiment of the small lens system according to the present invention, FIG. 3 shows an aberrational diagram according to a first exemplary embodiment of the present invention, FIG. 4 is a diagram showing a second exemplary embodiment of the telephoto lens system for high-resolution according to the present invention. FIG. 5 shows an aberrational diagram according to a second exemplary embodiment of the present invention, FIG. 6 is a diagram showing a third exemplary embodiment of the telephoto lens system according to the present invention, and FIG. 7 is an aberrational diagram according to a third exemplary embodiment of the present invention. FIG. 8 is a diagram showing a fourth exemplary embodiment of the telephoto lens system according to a fourth exemplary embodiment of the present invention. FIG. 9 is an aberrational diagram according to a fourth exemplary embodiment of the present invention. FIG. 10 is a diagram showing a fifth exemplary embodiment of the telephoto lens system according to a fifth exemplary embodiment of the present invention. FIG. 11 is an aberrational diagram according to a fifth exemplary embodiment of the present invention.

As shown, the present invention relates to a small lens system having a plurality of lenses arranged along an optical axis from a focal object side in order of a first lens L1, a second lens L2, a third lens L3, a fourth lens L4, and a fifth lens L5, wherein the first lens L1 has a positive refractive power; the second lens L2 has a negative refractive power, a rear surface of the second lens is concave toward the image side, a center interval $T_{12c}$ between the first lens L1 and the second lens L2 is $T_{12c}<0.2$ mm, and the effective outermost interval $T_{12e}$ between the first lens L1 and the second lens L2 satisfies $T_{12e}<0.2$ mm; the third lens L3 has a negative refractive power, and is biconcave; the fourth lens L4 has a negative refractive power, the front surface of the fourth lens is concave toward a focal object side, and the rear surface is convex toward an image side; and the fifth lens L5 has a positive refractive power, the front surface of the fifth lens is convex toward the focal object side, the rear curvature C10 satisfies $-0.01<C10<0.01$, and the periphery of the rear surface of the fifth lens is convex toward the image side, and wherein the center interval $T_{45c}$ between the fourth lens L4 and the fifth lens L5 is $T_{45c}<0.1$ mm, the effective outermost interval T45e between the fourth lens L4 and the fifth lens L5 is T45e>0.35 mm, and the value of the thickness ct1 of the first lens, the thickness ct2 of the second lens, the thickness ct3 of the third lens, the thickness ct4 of the four lenses, the thickness ct5 of the fifth lens, and the distance TL from the front surface of the first lens to the rear surface of the fifth lens satisfy (ct1+ct2+ct3+ct4+ct5)/TL<0.47.

These features allow each lens of the lens system to have a positive and negative refractive power evenly distributed, enabling high performance suitable for a high pixel lens system.

In particular, the first lens L1 has a positive refractive power, and the front surface of the first lens is convex toward the focal object side. The second lens L2 has a negative refractive power, the rear surface of the second lens are concave toward the focal object side, the center interval $T_{12c}$ between the first lens L1 and the second lens L2 satisfies $T_{12c}<0.2$ mm, and the effective outermost interval $T_{12e}$ between the first lens L1 and the second lens L2 satisfies $T_{12e}<0.2$ mm.

In other words, the length of the lens system is shortened by minimizing the distance between the first lens L1 and the second lens L2, so as to be suitable for the small lens system.

The third lens L3 has a negative refractive power, and is biconcave. The fourth lens L4 has a negative refractive power, the front surface of the fourth lens is concave toward a focal object side, and the rear surface is convex toward an image side. The fifth lens L5 has a positive refractive power, the front surface of the fifth lens is convex toward the focal object side, and the peripheral portion of the rear surface of the fifth lens is convex toward the image side. Thus, the overall refractive power distribution is formed evenly, various aberrations can be easily corrected, distortion is also corrected, and the shape of the lens is appropriately combined to suit a small lens system.

In the case of the fifth lens L5, the rear curvature C10 satisfies −0.01<C10<0.01, and the periphery of the rear surface of the fifth lens is formed to be convex toward the image, so that the fifth lens L5 is formed to be suitable for a small lens system.

The center interval $T_{45c}$ of the fourth lens L4 and the fifth lens L5 satisfies $T_{45c}$<0.1 mm, and the outermost interval T45e of the effective diameter of the fourth lens L4 and the fifth lens L5 is formed to satisfy $T_{45e}$>0.35 mm. Thus, the length of the lens system is shortened by minimizing the distance between the fourth lens L4 and the fifth lens L5.

The thickness of the first lens L1 is ct1, the thickness of the second lens L2 is ct2, the thickness of the third lens L3 is ct3, the thickness of the fourth lens L4 is ct4, and the thickness of the fifth lens L5 is ct5, and the distance TL from the front surface of the first lens L1 to the rear surface of the fifth lens L5 satisfy (ct1+ct2+ct3+ct4+ct5)/TL<0.47.

In other words, the sum of the thicknesses of the lenses with respect to the distance TL from the front surface of the lens to the outermost surface is formed to be less than ½ to provide a short length lens system.

Also, the distance T47 from the rear surface of the second lens L2 to the front surface of the fourth lens L4 is formed to satisfy T47>2.5 mm and minimize the distance from the second lens L2 to the fourth lens L4, and thus, the length of the lens system can be shortened.

In addition, the effective focal length f of the lens system, and the distance TTL from the front surface to the image surface of the lens system are formed to satisfy TTL/f<0.85, enabling to provide a very small lens system.

Besides, the lens system according to the present invention satisfies the angle of view VA, which is 26 degrees<VA<32 degrees.

In addition, since a composite focal length f12 of the first lens L1 and the second lens L2, and a composite focal length F345 of the third lens L3, the fourth lens L4, and the fifth lens L5 satisfies 0.8<|f12/f345|<1.2, the lens system has a strong refractive power, and thus, it is advantageous for realizing miniaturization and wide angle.

In addition, the Abbe number V1 of the first lens L1, the Abbe number V2 of the second lens L2, the Abbe number V3 of the third lens L3, the Abbe number V4 of L4 of the fourth lens, and the Abbe number V5 of the fifth lens L5 respectively satisfy 50<V1<60, 15<V2<30, 50<V3<60, 50<V4<60, and 15<V5<30, and all surfaces of the first lens L1 to the fifth lens L5 are made of a plastic material with aspherical surfaces, enabling each lens to have evenly distributed Abbe number and to correct the chromatic aberration.

As described above, the present invention relates to a lens system composed of a total of five lenses, and a lens system having a plurality of lenses arranged along an optical axis from a focal object side in order of a first lens, a second lens, a third lens, a fourth lens, and a fifth lens.

The present invention also relates to a small lens system capable of providing a high-resolution image by appropriately correcting distortion and realizing a smallness and lightness by designing a refractive power, a shape, and the like.

In particular, since a ratio between the total of the lens thicknesses and the distance TL from the front surface to the outermost surface of the lens system is less than ½, and a ratio between the effective focal length of the lens system and the distance TTL from the front surface to the image surface of the lens system is less than 0.85, thus a short lens system may be provided so that it may be easily applied to thin or small camera modules, especially a smartphone.

Hereinafter, embodiments of the present invention will be described more fully with reference to the accompanying drawings.

EMBODIMENT 1

FIG. 2 shows a first embodiment of a wide-angle lens system for high resolution according to the present invention. As shown, the first lens L1, the second lens L2, the third lens L3, the fourth lens L4, and the fifth lens L5 are arranged in order from a focal object side along the optical axis.

Table 1 shows numerical data of the lenses configuring the optical system according to the first embodiment of the present invention.

TABLE 1

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.823 | 1.13 | 1.544 | 56.0 |
| 2 | −9.001 | 0.11 | | |
| 3 | −66.481 | 0.22 | 1.671 | 19.5 |
| STO: | 4.136 | 1.04 | | |
| 5 | −42.890 | 0.21 | 1.544 | 56.0 |
| 6 | 3.065 | 1.81 | | |
| 7 | −2.506 | 0.25 | 1.544 | 56.0 |
| 8 | −13.680 | 0.05 | | |
| 9 | 4.482 | 0.61 | 1.671 | 19.5 |
| 10 | −2000.000 | 0.10 | | |
| 11 | INFINITY | 0.11 | 1.517 | 64.2 |
| 12 | INFINITY | 0.62 | | |
| IMG: | INFINITY | 0.00 | | |

As shown in FIG. 2, the first lens L1, the second lens L2, the third lens L3, the fourth lens L4, and the fifth lens L5 are arranged from a focal object side. When the optical axis direction is set to X-axis and the direction orthogonal to the optical axis is set to the Y-axis, then the aspherical expression is as follows.

[Equation 1]

$$X(Y) = \frac{Y^2}{R} \frac{1}{1+\sqrt{1-(1+K)\left(\frac{Y}{R}\right)^2}} + A_3 Y^4 + A_4 Y^6 + A_5 Y^8 + A_6 Y^{10} + \ldots + A_{14} Y^{26}$$

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 2 below.

TABLE 2

| | K | A3 | A4 | A5 | A6 | A7 |
|---|---|---|---|---|---|---|
| s1 | 0.12627 | 1.552030E−04 | 7.296990E−05 | 1.297390E−03 | 1.451520E−03 | 7.267430E−04 |
| s2 | 99.00000 | 5.057870E−04 | 1.850330E−02 | 1.984990E−02 | 1.134910E−02 | 3.943210E−03 |
| s3 | 99.00000 | 1.463190E−02 | 4.280280E−02 | 4.084110E−02 | 2.619760E−02 | 1.034110E−02 |
| s4 | 1.99500 | −1.330370E−02 | −4.746840E−02 | 3.809400E−01 | −1.115930E+00 | 1.946010E+00 |
| s5 | 21.00000 | 2.723920E−02 | 5.356080E−02 | 4.794070E−02 | 8.862190E−02 | 1.210440E−01 |
| s6 | 6.21480 | 3.840330E−02 | 1.084480E−01 | 7.461130E−01 | 9.913750E+00 | 4.053340E+01 |
| s7 | 21.00000 | 2.661020E−02 | 2.537790E−02 | 1.493990E−01 | 2.181830E−01 | 1.772520E−01 |
| s8 | 19.94691 | 2.372500E−02 | 4.568610E−02 | 2.927100E−02 | 1.112870E−02 | 2.963350E−03 |
| s9 | 17.42647 | 9.824140E−02 | 1.685080E−01 | 2.104330E−01 | 1.920590E−01 | 1.206460E−01 |
| s10 | 21.00000 | 3.842180E−02 | 1.587280E−02 | 3.583170E−03 | 3.192330E−04 | 1.752840E−04 |

| | | A8 | A9 | A10 | A11 |
|---|---|---|---|---|---|
| | s1 | 2.065820E−04 | 3.619980E−05 | 6.044830E−06 | 8.174850E−07 |
| | s2 | 8.420130E−04 | 1.169670E−04 | 5.112350E−06 | 1.988660E−06 |
| | s3 | 2.496840E−03 | 3.408680E−04 | 4.068510E−05 | 1.700260E−06 |
| | s4 | −2.099160E+00 | 1.372050E+00 | −4.974240E−01 | 7.676380E−02 |
| | s5 | 9.315810E−02 | 4.088020E−02 | 9.676300E−03 | 1.008060E−03 |
| | s6 | 8.674790E+01 | 1.043100E+02 | 6.679220E+01 | 1.775560E+01 |
| | s7 | 8.793670E−02 | 2.622860E−02 | 4.314950E−03 | 3.012640E−04 |
| | s8 | 3.859170E−04 | 1.745730E−05 | 1.917660E−06 | 9.028840E−07 |
| | s9 | 4.946790E−02 | 1.260620E−02 | 1.799900E−03 | 1.090550E−04 |
| | s10 | 4.475220E−05 | 5.229850E−06 | 1.863610E−08 | 1.081200E−07 |

In addition, a total sum of the thickness ct1 of the first lens L1, the thickness ct2 of the second lens L2, the thickness ct3 of the third lens L3, the thickness ct4 of the fourth lens L4, and the thickness ct5 of the fifth lens L5 to the distance TL from the front surface of the first lens L1 to the rear surface of the fifth lens L5 satisfy (ct1+ct2+ct3+ct4+ct5)/TL=0.45, In addition, the distance TTL from the front surface of the lens system to the image surface to the effective focal length f of the lens system satisfies TTL/f=0.84.

In addition, the center interval $T_{12c}$ between the first lens L1 and the second lens L2 satisfies $T_{12c}$=0.11 mm, and the effective outermost interval $T_{12e}$ between the first lens L1 and the second lens L2 satisfies $T_{12e}$=0.18 mm.

In addition, the rear curvature C10 of the fifth lens L5 is 0.005, the center interval $T_{45c}$ between the fourth lens L4 and the fifth lens L5 is 0.05 mm, and the outermost interval T45e of the effective diameter between the fourth lens L4 and the fifth lens L5 is 0.24 mm.

In addition, the distance T47 from the rear surface of the second lens L2 to the front surface of the fourth lens L4 is 3.06 mm, and the angle of view VA is 30.1 degrees. Provided with the composite focal length f12 of the first lens L1 and the second lens L2, and the composite focal length f345 of the third lens L3, the fourth lens L4, and the fifth lens L5, the absolute value ratio satisfies |f12/f345|=0.93.

FIG. 3 shows an aberration diagram according to the first embodiment of the present invention.

The first data of FIG. 3 shows spherical aberration, where the horizontal axis represents the focal point (mm), the vertical axis represents the image height (mm), and each graph represents the wavelength of incident light.

As shown, the graphs are known to have good spherical aberration correction ability as the graphs approach the central vertical axis or to each other. The spherical aberration of the first embodiment according to the present invention is 0.025 mm or less (focus) and is considered to be good.

The second data of FIG. 3 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens.

Here, it is known that the closer the graphs S and T and the closer to the central vertical axis, the better the astigmatism correction ability. The spherical aberration of the first embodiment according to the present invention is 0.025 mm or less and is considered to be good.

The third data of FIG. 3 shows distortion aberration, where the horizontal axis represents the distortion degree (%) and the vertical axis represents the height of an image (mm).

Generally, it is known to be good if the aberration curve is in the range of −2 to 2%. Optical distortion, which is the distortion aberration of the first embodiment according to the present invention, is judged to be good at 2% or less.

EMBODIMENT 2

FIG. 4 shows a second embodiment of a wide-angle lens system for high resolution according to the present invention.

As shown, the first lens L1, the second lens L2, the third lens L3, the fourth lens L4, and the fifth lens L5 are arranged in order from a focal object side along the optical axis.

Table 3 shows numerical data of the lenses configuring the optical system according to the second embodiment of the present invention.

TABLE 3

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.824 | 1.13 | 1.544 | 56.0 |
| 2 | −8.979 | 0.06 | | |
| 3 | −26.062 | 0.22 | 1.671 | 19.5 |
| STO: | 5.071 | 1.06 | | |
| 5 | −36.591 | 0.21 | 1.544 | 56.0 |

TABLE 3-continued

| Surface (Surface Number) | RDY (Radius of Curvature) | THI (Thickness) | Nd (Refractive Index) | Vd (Abbe Number) |
|---|---|---|---|---|
| 6 | 3.008 | 1.83 | | |
| 7 | −2.511 | 0.25 | 1.544 | 56.0 |
| 8 | −10.101 | 0.09 | | |
| 9 | 5.210 | 0.58 | 1.671 | 19.5 |
| 10 | −2000.000 | 0.10 | | |
| 11 | INFINITY | 0.11 | 1.517 | 64.2 |
| 12 | INFINITY | 0.62 | | |
| IMG: | INFINITY | 0.00 | | |

As shown in FIG. 4, the first lens L1, the second lens L2, the third lens L3, the fourth lens L4, and the fifth lens L5 are arranged from a focal object side. When the optical axis direction is set to X-axis and the direction orthogonal to the optical axis is set to the Y-axis, then the aspherical expression is as the equation 1 above.

An aspheric surface is a curved surface produced by rotating the curve obtained by the aspherical expression of Equation 1 around the optical axis, R is the radius of curvature, K is a conic constant, and A3, A4, A5, A6, . . . , A14 are aspherical coefficients.

Aspheric coefficients having data for the above lenses from Equation 1 are shown in Table 4 below.

TABLE 4

| | K | A3 | A4 | A5 | A6 |
|---|---|---|---|---|---|
| s1 | 0.12033 | 3.905380E−04 | 1.707400E−04 | 1.316780E−03 | 1.429220E−03 |
| s2 | 99.00000 | 9.948800E−05 | 1.859600E−02 | 1.980580E−02 | 1.137220E−02 |
| s3 | 68.90924 | 1.465800E−02 | 4.285970E−02 | 4.084400E−02 | 2.617580E−02 |
| s4 | 2.05404 | 1.422890E−02 | 2.404740E−02 | 2.468260E−01 | 6.759920E−01 |
| s5 | 20.49762 | 2.871380E−02 | 5.554970E−02 | 4.353160E−02 | 8.516460E−02 |
| s6 | 6.18003 | 4.525380E−02 | 4.133560E−02 | 1.194050E+00 | 1.185960E+01 |
| s7 | 20.99020 | 4.687940E−02 | 1.648420E−02 | 1.060730E−01 | 1.993000E−01 |
| s8 | 4.33393 | 2.148300E−02 | 4.475040E−02 | 2.943290E−02 | 1.115910E−02 |
| s9 | 21.00000 | 9.080100E−02 | 1.441340E−01 | 1.877410E−01 | 1.808090E−01 |
| s10 | 21.00000 | 4.234980E−02 | 1.549920E−02 | 3.608810E−03 | 3.082950E−04 |

| | A7 | A8 | A8 | A10 | A11 |
|---|---|---|---|---|---|
| s1 | 7.351090E−04 | 2.046960E−04 | 3.641170E−05 | 6.100070E−06 | 8.707040E−07 |
| s2 | 3.934920E−03 | 8.439220E−04 | 1.167870E−04 | 5.130530E−06 | 2.128100E−06 |
| s3 | 1.035430E−02 | 2.492060E−03 | 3.422880E−04 | 3.988850E−05 | 2.654170E−06 |
| s4 | 1.071420E+00 | 1.041090E+00 | 6.106780E−01 | 1.982160E−01 | 2.732040E−02 |
| s5 | 1.210440E−01 | 9.315810E−02 | 4.088020E−02 | 9.676300E−03 | 1.008060E−03 |
| s6 | 4.602520E+01 | 9.669740E+01 | 1.154000E+02 | 7.370600E+01 | 1.959320E+01 |
| s7 | 1.820900E−01 | 9.799530E−02 | 3.121720E−02 | 5.445210E−03 | 4.018080E−04 |
| s8 | 2.955000E−03 | 3.823520E−04 | 1.828170E−05 | 2.066270E−06 | 1.129250E−06 |
| s9 | 1.188900E−01 | 5.056980E−02 | 1.330800E−02 | 1.960330E−03 | 1.226110E−04 |
| s10 | 1.769440E−04 | 4.400890E−05 | 5.313760E−06 | 2.650260E−08 | 1.243870E−07 |

In addition, a total sum of the thickness ct1 of the first lens L1, the thickness ct2 of the second lens L2, the thickness ct3 of the third lens L3, the thickness ct4 of the fourth lens L4, and the thickness ct5 of the fifth lens L5 to the distance TL from the front surface of the first lens L1 to the rear surface of the fifth lens L5 satisfies (ct1+ct2+ct3+ct4+ct5)/TL=0.44.

In addition, the distance TTL from the front surface of the lens system to the image surface to the effective focal length f of the lens system to satisfies TTL/f=0.84.

In addition, the center interval $T_{12c}$ between the first lens L1 and the second lens L2 is 0.06 mm, and the outermost interval $T_{12e}$ of effective diameter between the first lens L1 and the second lens L2 0.11 mm.

In addition, the rear curvature C10 of the fifth lens L5 is 0.005, the center interval $T_{45c}$ of the fifth lens L5 is 0.09 mm, and the outermost interval T45e of the effective diameter between the fourth lens L4 and the fifth lens L5 is 0.24 mm.

In addition, the distance T47 from the rear surface of the second lens L2 to the front surface of the fourth lens L4 is 3.01 mm, the angle of view VA is 30.1 degrees. Provided with the composite focal length f12 of the first lens L1 and the second lens L2, and the composite focal length f345 of the third lens L3, the fourth lens L4, and the fifth lens L5, the absolute value ratio satisfies |f12/f345|=0.96.

FIG. 5 shows an aberration diagram according to the second embodiment of the present invention.

The first data of FIG. 5 shows spherical aberration, where the horizontal axis represents the focal point (mm), the vertical axis represents the image height (mm), and each graph represents the wavelength of incident light.

As shown, the graphs are known to have good spherical aberration correction ability as the graphs approach the central vertical axis or to each other. The spherical aberration of the second embodiment according to the present invention is 0.025 mm (focus) or less and is considered to be good.

The second data of FIG. 5 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens.

Here, it is known that the closer the graphs S and T and the closer to the central vertical axis, the better the astigmatism correction ability. The spherical aberration of the second embodiment according to the present invention is 0.025 mm or less and is considered to be good.

The third data of FIG. 5 shows distortion aberration, where the horizontal axis represents the distortion degree (%) and the vertical axis represents the height of an image (mm).

Generally, it is known to be good if the aberration curve is in the range of −2~2%. Optical distortion, which is the distortion aberration of the second embodiment according to the present invention, is judged to be good at 2% or less.

EMBODIMENT 3

FIG. 6 shows a third embodiment of a wide-angle lens system for high resolution according to the present invention.

As shown, the first lens L1, the second lens L2, the third lens L3, the fourth lens L4, and the fifth lens L5 are arranged in order from the focal object side along the optical axis.

Table 5 shows numerical data of the lenses configuring the optical system according to the third embodiment of the present invention.

TABLE 5

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.818 | 1.14 | 1.544 | 56.0 |
| 2 | −8.923 | 0.11 | | |
| 3 | −35.435 | 0.22 | 1.671 | 19.5 |
| STO: | 4.404 | 1.06 | | |
| 5 | −10.000 | 0.21 | 1.544 | 56.0 |
| 6 | 3.894 | 1.81 | | |
| 7 | −2.646 | 0.25 | 1.544 | 56.0 |
| 8 | −15.391 | 0.03 | | |
| 9 | 4.655 | 0.61 | 1.671 | 19.5 |
| 10 | −2000.000 | 0.10 | | |
| 11 | INFINITY | 0.11 | 1.517 | 64.2 |
| 12 | INFINITY | 0.62 | | |
| IMG: | INFINITY | 0.00 | | |

As shown in FIG. 6, the first lens L1, the second lens L2, the third lens L3, the fourth lens L4, and the fifth lens L5 are arranged from the focal object side. When the optical axis direction is set to X-axis and the direction orthogonal to the optical axis is set to the Y-axis, then the aspherical expression is the same as the above equation 1.

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 6 below.

TABLE 6

| | K | A3 | A4 | A5 | A6 |
|---|---|---|---|---|---|
| s1 | 0.12562 | 7.825840E−05 | 1.728700E−04 | 1.257070E−03 | 1.453100E−03 |
| s2 | 98.98438 | 5.700140E−04 | 1.842590E−02 | 1.984570E−02 | 1.136180E−02 |
| s3 | 99.00000 | 1.430620E−02 | 4.303400E−02 | 4.080610E−02 | 2.618370E−02 |
| s4 | 2.12390 | 1.389010E−02 | 4.442790E−02 | 3.673940E−01 | 1.065060E+00 |
| s5 | 21.00000 | 3.170510E−02 | 5.544870E−02 | 4.188780E−02 | 8.384330E−02 |
| s6 | 8.89784 | 5.939340E+00 | 3.802340E+01 | 1.372150E+00 | 1.260050E+01 |
| s7 | 21.00000 | 2.398980E−03 | 8.050170E−02 | 2.311170E−01 | 2.985240E−01 |
| s8 | 20.93997 | 1.924630E−02 | 4.352700E−02 | 2.967770E−02 | 1.124500E−02 |
| s9 | 15.31597 | 9.885220E−02 | 1.741580E−01 | 2.161810E−01 | 1.921910E−01 |
| s10 | 21.00000 | 3.680810E−02 | 1.505460E−02 | 3.645130E−03 | 3.005780E−04 |

| | A7 | A8 | A9 | A10 | A11 |
|---|---|---|---|---|---|
| s1 | 7.292240E−04 | 2.058100E−04 | 3.622690E−05 | 6.155550E−06 | 9.110110E−07 |
| s2 | 3.938820E−03 | 8.421140E−04 | 1.175810E−04 | 4.847020E−06 | 2.068720E−06 |
| s3 | 1.034710E−02 | 2.499140E−03 | 3.376950E−04 | 4.144600E−05 | 3.341670E−06 |
| s4 | 1.833620E+00 | 1.951980E+00 | 1.259080E+00 | 4.504260E−01 | 6.856840E−02 |
| s5 | 1.210440E−01 | 9.315810E−02 | 4.088020E−02 | 9.676300E−03 | 1.008060E−03 |
| s6 | 4.735390E+01 | 9.718210E+01 | 1.137390E+02 | 7.139480E+01 | 1.868350E+01 |
| s7 | 2.285760E−01 | 1.090480E−01 | 3.167770E−02 | 5.123320E−03 | 3.537240E−04 |
| s8 | 2.926800E−03 | 3.925420E−04 | 1.575940E−05 | 2.887540E−06 | 7.199770E−07 |
| s9 | 1.176140E−01 | 4.719120E−02 | 1.183020E−02 | 1.670460E−03 | 1.005430E−04 |
| s10 | 1.808720E−04 | 4.418630E−05 | 5.218470E−06 | 9.598520E−09 | 1.040450E−07 |

In addition, a total sum of the thickness ct1 of the first lens L1, the thickness ct2 of the second lens L2, the thickness ct3 of the third lens L3, the thickness ct4 of the fourth lens L4, and the thickness ct5 of the fifth lens L5 to the distance TL from the front surface of the first lens L1 to the rear surface of the fifth lens L5 satisfies (ct1+ct2+ct3+ct4+ct5)/TL=0.45.

In addition, the distance TTL from the front surface of the lens system to the image surface to the effective focal length f of the lens system satisfies TTL/f=0.84.

In addition, the center interval $T_{12c}$ between the first lens L1 and the second lens L2 is 0.11 mm, and the outermost interval $T_{12e}$ of effective diameter between the first lens L1 and the second lens L2 is 0.17 mm.

In addition, the rear curvature C10 of the fifth lens L5 is 0.005, the center interval $T_{45c}$ of the fifth lens L5 is 0.03 mm, and the outermost interval T45e of the effective diameter between the fourth lens L4 and the fifth lens L5 is 0.20 mm.

In addition, the distance T47 from the rear surface of the second lens L2 to the front surface of the fourth lens L4 is 3.08 mm, the angle of view VA is 30.1 degrees. Provided with the composite focal length f12 of the first lens L1 and the second lens L2, and the composite focal length f345 of the third lens L3, the fourth lens L4, and the fifth lens L5, the absolute value ratio satisfies |f12/f345|=0.94.

FIG. 7 shows an aberration diagram according to the third embodiment of the present invention.

The first data of FIG. 7 shows spherical aberration, where the horizontal axis represents the focal point (mm), the vertical axis represents the image height (mm), and each graph represents the wavelength of incident light.

As shown, the graphs are known to have good spherical aberration correction ability as the graphs approach the central vertical axis or to each other. The spherical aberration of the third embodiment according to the present invention is 0.025 mm or less and is considered to be good.

The second data of FIG. 7 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens.

Here, it is known that the closer the graphs S and T and the closer to the central vertical axis, the better the astigmatism correction ability. The spherical aberration of the third embodiment according to the present invention is 0.025 mm or less and is considered to be good.

The third data of FIG. 7 shows distortion aberration, where the horizontal axis represents the distortion degree (%) and the vertical axis represents the height of an image (mm).

Generally, it is known to be good if the aberration curve is in the range of −2~2%. Optical distortion, which is the distortion aberration of the third embodiment according to the present invention, is judged to be good at 2% or less.

EMBODIMENT 4

FIG. 8 shows a fourth embodiment of a wide-angle lens system for high resolution according to the present invention.

As shown, the first lens L1, the second lens L2, the third lens L3, the fourth lens L4, and the fifth lens L5 are arranged in order from the focal object side along the optical axis.

Table 7 shows numerical data of the lenses configuring the optical system according to the fourth embodiment of the present invention.

TABLE 7

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.829 | 1.13 | 1.544 | 56.0 |
| 2 | −8.788 | 0.11 | | |
| 3 | −69.150 | 0.22 | 1.671 | 19.5 |
| STO: | 4.125 | 1.04 | | |
| 5 | −154.311 | 0.21 | 1.544 | 56.0 |
| 6 | 2.952 | 1.85 | | |
| 7 | −1.819 | 0.25 | 1.544 | 56.0 |
| 8 | −3.846 | 0.02 | | |
| 9 | 5.358 | 0.61 | 1.671 | 19.5 |
| 10 | −2000.000 | 0.10 | | |
| 11 | INFINITY | 0.11 | 1.517 | 64.2 |

TABLE 7-continued

| Surface (Surface Number) | RDY (Radius of Curvature) | THI (Thickness) | Nd (Refractive Index) | Vd (Abbe Number) |
|---|---|---|---|---|
| 12 | INFINITY | 0.62 | | |
| IMG: | INFINITY | | | |

As shown in FIG. 8, the first lens L1, the second lens L2, the third lens L3, the fourth lens L4, and the fifth lens L5 are arranged from the focal object side. When the optical axis direction is set to X-axis and the direction orthogonal to the optical axis is set to the Y-axis, then the aspherical expression is the same as the equation 1 above.

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 8 below.

TABLE 8

| | K | A3 | A4 | A5 | A6 |
|---|---|---|---|---|---|
| s1 | 0.12658 | 1.301400E−04 | 2.035910E−04 | 1.218090E−03 | 1.458970E−03 |
| s2 | 99.00000 | 3.985650E−04 | 1.837460E−02 | 1.983980E−02 | 1.137140E−02 |
| s3 | 99.00000 | 1.390800E−02 | 4.328820E−02 | 4.079420E−02 | 2.614790E−02 |
| s4 | 2.35002 | 1.400560E−02 | 4.443730E−02 | 3.781890E−01 | 1.111900E+00 |
| s5 | 21.00000 | 3.893370E−02 | 6.039610E−02 | 4.034150E−02 | 8.477220E−02 |
| s6 | 6.14661 | 5.179030E−02 | 1.947640E−01 | 1.416460E+00 | 1.333440E+01 |
| s7 | 18.45482 | 1.465180E−01 | 2.951440E−01 | 3.608070E−01 | 3.190560E−01 |
| s8 | 21.00000 | 9.490020E−03 | 4.246520E−02 | 2.935910E−02 | 1.114460E−02 |
| s9 | 13.67947 | 9.614170E−02 | 1.784510E−01 | 2.369930E−01 | 2.283210E−01 |
| s10 | 21.00000 | 3.676830E−02 | 1.622790E−02 | 3.532650E−03 | 3.405520E−04 |

| | A7 | A8 | A9 | A10 | A11 |
|---|---|---|---|---|---|
| s1 | 7.286720E−04 | 2.058540E−04 | 3.631240E−05 | 6.061670E−06 | 8.548090E−07 |
| s2 | 3.936940E−03 | 8.409890E−04 | 1.186080E−04 | 4.529820E−06 | 2.213910E−06 |
| s3 | 1.036490E−02 | 2.497270E−03 | 3.347860E−04 | 4.347850E−05 | 3.393310E−06 |
| s4 | 1.940080E+00 | 2.092290E+00 | 1.366430E+00 | 4.946600E−01 | 7.618210E−02 |
| s5 | 1.210440E−01 | 9.315810E−02 | 4.088020E−02 | 9.676300E−03 | 1.008060E−03 |
| s6 | 5.147420E+01 | 1.085800E+02 | 1.305880E+02 | 8.422510E+01 | 2.264390E+01 |
| s7 | 1.977540E−01 | 8.247410E−02 | 2.215550E−02 | 3.469370E−03 | 2.388580E−04 |
| s8 | 2.982040E−03 | 3.727270E−04 | 2.190460E−05 | 6.731700E−07 | 1.518660E−06 |
| s9 | 1.492840E−01 | 6.306780E−02 | 1.642150E−02 | 2.380500E−03 | 1.459490E−04 |
| s10 | 1.810990E−04 | 4.534880E−05 | 4.721050E−06 | 6.960770E−08 | 1.329970E−07 |

In addition, a total sum of the thickness ct1 of the first lens L1, the thickness ct2 of the second lens L2, the thickness ct3 of the third lens L3, the thickness ct4 of the fourth lens L4, and the thickness ct5 of the fifth lens L5 to the distance TL from the front surface of the first lens L1 to the rear surface of the fifth lens L5 satisfies (ct1+ct2+ct3+ct4+ct5)/TL=0.45.

In addition, the distance TTL from the front surface of the lens system to the image surface to the effective focal length f of the lens system satisfies TTL/f=0.84.

In addition, the center interval $T_{12c}$ between the first lens L1 and the second lens L2 is 0.11 mm, and the outermost interval $T_{12e}$ of effective diameter between the first lens L1 and the second lens L2 0.19 mm.

In addition, the rear curvature C10 of the fifth lens L5 is 0.005, the center interval $T_{45c}$ of the fifth lens L5 is 0.02 mm, and the outermost interval T45e of the effective diameter between the fourth lens L4 and the fifth lens L5 is 0.31 mm.

In addition, the distance T47 from the rear surface of the second lens L2 to the front surface of the fourth lens L4 is 3.06 mm, the angle of view VA is 30.1 degrees. Provided with the composite focal length f12 of the first lens L1 and the second lens L2, and the composite focal length f345 of the third lens L3, the fourth lens L4, and the fifth lens L5, the absolute value ratio satisfies |f12/f345|=0.91.

FIG. 9 shows an aberration diagram according to the fourth embodiment of the present invention.

The first data of FIG. 9 shows spherical aberration, where the horizontal axis represents the focal point (mm), the vertical axis represents the image height (mm), and each graph represents the wavelength of incident light.

As shown, the graphs are known to have good spherical aberration correction ability as the graphs approach the central vertical axis or to each other. The spherical aberration of the fourth embodiment according to the present invention is 0.025 mm or less and is considered to be good.

The second data of FIG. 9 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens.

Here, it is known that the closer the graphs S and T and the closer to the central vertical axis, the better the astigmatism correction ability. The spherical aberration of the fourth embodiment according to the present invention is 0.025 mm or less and is considered to be good.

The third data of FIG. 9 shows distortion aberration, where the horizontal axis represents the distortion degree (%) and the vertical axis represents the height (mm).

Generally, it is known to be good if the aberration curve is in the range of −2~2%. Optical distortion, which is the distortion aberration of the fourth embodiment according to the present invention, is judged to be good at 2% or less.

EMBODIMENT 5

FIG. 10 shows a fifth embodiment of a wide-angle lens system for high resolution according to the present invention.

As shown, the first lens L1, the second lens L2, the third lens L3, the fourth lens L4, and the fifth lens L5 are arranged in order from the focal object side along the optical axis.

Table 9 shows numerical data of the lenses configuring the optical system according to the fifth embodiment of the present invention.

TABLE 9

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.828 | 1.13 | 1.544 | 56.0 |
| 2 | −8.888 | 0.05 | | |
| 3 | −22.095 | 0.22 | 1.671 | 19.5 |
| STO: | 5.372 | 1.06 | | |
| 5 | −59.313 | 0.21 | 1.544 | 56.0 |
| 6 | 2.919 | 1.89 | | |
| 7 | −1.891 | 0.26 | 1.544 | 56.0 |
| 8 | −3.846 | 0.05 | | |
| 9 | 6.226 | 0.57 | 1.671 | 19.5 |
| 10 | −2000.000 | 0.10 | | |
| 11 | INFINITY | 0.11 | 1.517 | 64.2 |
| 12 | INFINITY | 0.62 | | |
| IMG: | INFINITY | 0.00 | | |

As shown in FIG. 10, the first lens L1, the second lens L2, the third lens L3, the fourth lens L4, and the fifth lens L5 are arranged from the focal object side. When the optical axis direction is set to X-axis and the direction orthogonal to the optical axis is set to the Y-axis, then the aspherical expression is as the equation 1 above.

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 10 below.

TABLE 10

| | K | A3 | A4 | A5 | A6 |
|---|---|---|---|---|---|
| s1 | 0.12658 | 1.301400E−04 | 2.035910E−04 | 1.218090E−03 | 1.458970E−03 |
| s2 | 99.00000 | 3.985650E−04 | 1.837460E−02 | 1.983980E−02 | 1.137140E−02 |
| s3 | 99.00000 | 1.390800E−02 | 4.328820E−02 | 4.079420E−02 | 2.614790E−02 |
| s4 | 2.35002 | 1.400560E−02 | 4.443730E−02 | 3.781890E−01 | 1.111900E+00 |
| s5 | 21.00000 | 3.893370E−02 | 6.039610E−02 | 4.034150E−02 | 8.477220E−02 |
| s6 | 6.14661 | 5.179030E−02 | 1.947640E−02 | 1.416460E+00 | 1.333440E+01 |
| s7 | 18.45482 | 1.465180E−01 | 2.951440E−01 | 3.608070E−01 | 3.190560E−01 |
| s8 | 21.00000 | 9.490020E−03 | 4.246520E−02 | 2.935910E−02 | 1.114460E−02 |
| s9 | 13.67947 | 9.614170E−02 | 1.784510E−01 | 2.369930E−01 | 2.283210E−01 |
| s10 | 21.00000 | 3.676830E−02 | 1.622790E−02 | 3.532650E−03 | 3.405520E−04 |

| | A7 | A8 | A9 | A10 | A11 |
|---|---|---|---|---|---|
| s1 | 7.286720E−04 | 2.058540E−04 | 3.631240E−05 | 6.061670E−06 | 8.548090E−07 |
| s2 | 3.936940E−03 | 8.409890E−04 | 1.186080E−04 | 4.529820E−06 | 2.213910E−06 |
| s3 | 1.036490E−02 | 2.497270E−03 | 3.347860E−04 | 4.347850E−05 | 3.393310E−06 |
| s4 | 1.940080E+00 | 2.092290E+00 | 1.366430E+00 | 4.946600E−01 | 7.618210E−02 |
| s5 | 1.210440E−01 | 9.315810E−02 | 4.088020E−02 | 9.676300E−03 | 1.008060E−03 |
| s6 | 5.147420E+01 | 1.085800E+02 | 1.305880E+02 | 8.422510E+01 | 2.264390E+01 |
| s7 | 1.977540E−01 | 8.247410E−02 | 2.215550E−02 | 3.469370E−03 | 2.388580E−04 |
| s8 | 2.982040E−03 | 3.727270E−04 | 2.190460E−05 | 6.731700E−07 | 1.518660E−06 |
| s9 | 1.492840E−01 | 6.306780E−02 | 1.642150E−02 | 2.380500E−03 | 1.459490E−04 |
| s10 | 1.810990E−04 | 4.534880E−05 | 4.721050E−06 | 6.960770E−08 | 1.329970E−07 |

In addition, a total sum of the thickness ct1 of the first lens L1, the thickness ct2 of the second lens L2, the thickness ct3 of the third lens L3, the thickness ct4 of the fourth lens L4, and the thickness ct5 of the fifth lens L5 to the distance TL from the front surface of the first lens L1 to the rear surface of the fifth lens L5 satisfies (ct1+ct2+ct3+ct4+ct5)/TL=0.44.

In addition, the distance TTL from the front surface of the lens system to the image surface to the effective focal length f of the lens system satisfies TTL/f=0.84.

In addition, the center interval $T_{12c}$ between the first lens L1 and the second lens L2 is 0.05 mm, and the outermost interval $T_{12e}$ of effective diameter between the first lens L1 and the second lens L2 is 0.1 mm.

In addition, the rear curvature C10 of the fifth lens L5 is 0.005, the center interval $T_{45c}$ of the fifth lens L5 is 0.05 mm, and the outermost interval T45e of the effective diameter between the fourth lens L4 and the fifth lens L5 is 0.26 mm.

In addition, the distance T47 from the rear surface of the second lens L2 to the front surface of the fourth lens L4 is 3.16 mm, the angle of view VA is 30.1 degrees. Provided with the composite focal length f12 of the first lens L1 and the second lens L2, and the composite focal length f345 of the third lens L3, the fourth lens L4, and the fifth lens L5, the absolute value ratio satisfies |f12/f345|=0.95.

FIG. 10 shows an aberration diagram according to the fifth embodiment of the present invention.

The first data of FIG. 10 shows spherical aberration, where the horizontal axis represents the focal point (mm), the vertical axis represents the image height (mm), and each graph represents the wavelength of incident light. As shown, the graphs are known to have good spherical aberration correction ability as the graphs approach the central vertical axis or to each other. The spherical aberration of the first embodiment according to the present invention is 0.025 mm or less and is considered to be good.

The second data of FIG. 10 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction ability. The spherical aberration of the fifth embodiment according to the present invention is 0.025 mm or less and is considered to be good.

The third data of FIG. 10 shows distortion aberration, where the horizontal axis represents the distortion degree (%) and the vertical axis represents the image height (mm). Generally, it is known to be good if the aberration curve is in the range of −2~2%. Optical distortion, which is the distortion aberration of the fifth embodiment according to the present invention, is judged to be good at 2% or less.

What is claimed is:

1. A small lens system having a plurality of lenses arranged along an optical axis from a focal object side in order of a first lens (L1), a second lens (L2), a third lens (L3), a fourth lens (L4), and a fifth lens (L5), the small lens system comprising:
   the first lens (L1), wherein the first lens (L1) has a positive refractive power and a front surface of the first lens is convex toward the focal object side;
   the second lens (L2), wherein the second lens (L2) has a negative refractive power, a rear surface of the second lens is concave toward image side, a center interval $(T_{12c})$ of the first lens and the second lens satisfies $T_{12c}$<0.2 mm, and an outermost interval $(T_{12e})$ of an effective diameter of the first lens and the second lens satisfies $T_{12e}$<0.2 mm;
   the third lens (L3), wherein the third lens (L3) has a negative refractive power, and is biconcave;
   the fourth lens (L4), wherein the fourth lens (L4) has a negative refractive power, a front surface of the fourth lens is concave toward the focal object side, and a rear surface of the fourth lens is convex toward the image side; and
   the fifth lens (L5), wherein the fifth lens (L5) has a positive refractive power, a front surface of the fifth lens is convex toward the focal object side, a curvature of a rear surface (C10) satisfies −0.01<C10<0.01, and a periphery of the rear surface is convex toward the image side,
   wherein a center interval $(T_{45c})$ of the fourth lens and the fifth lens satisfies $T_{45c}$<0.1 mm,
   an outermost interval (T45e) of an effective diameter of the fourth and fifth lenses satisfies T45e>0.35 mm, and
   a value of a thickness (ct1) of the first lens (L1), a thickness (ct2) of the second lens (L2), a thickness (ct3) of the third lens (L3), a thickness (ct4) of the fourth lens (L4), and a thickness (ct5) of the fifth lens (L5), and a distance (TL) from the front surface of the first lens (L1) to the rear surface of the fifth lens (L5) satisfies (ct1+ct2+ct3+ct4+ct5)/TL<0.47.

2. The small lens system of claim 1, wherein a distance (T47) from the rear surface of the second lens to the front surface of the fourth lens satisfies T47>2.5 mm.

3. The small lens system of claim 1, wherein a distance (TTL) from the front surface of the lens system to an image surface and an effective focal length (f) of the lens system satisfies TTL/f<0.85.

4. The small lens system of claim 1, wherein an angle of view (VA) satisfies 26 degrees<VA<32 degrees.

5. The small lens system of claim 1, wherein a composite focal length (f12) of the first lens (L1) and the second lens (L2), and a composite focal length (f345) of the third lens (L3), the fourth lens (L4), and the fifth lens (L5) satisfy 0.8<|f12/f345|<1.2.

6. The small lens system of claim 1, wherein an Abbe number (V1) of the first lens (L1), an Abbe number (V2) of the second lens (L2), an Abbe number (V3) of the third lens (L3), an Abbe number (V4) of the fourth lens (L4), and an Abbe number (V5) of the fifth lens (L5) respectively satisfy 50<V1<60, 15<V2<30, 50<V3<60, 50<V4<60, and 15<V5<30.

7. The small lens system of claim 1, wherein all of the first to fifth lenses are made of a plastic material and all surfaces are aspherical.

8. A small lens system mounted on a smartphone, having a plurality of lenses arranged along an optical axis from a focal object side in order of a first lens, a second lens, a third lens, a fourth lens and a fifth lens, wherein
   the first lens (L1) has a positive refractive power and a front surface of the first lens is convex toward the focal object side;
   the second lens (L2) has a negative refractive power, a rear surface of the second lens is concave toward an image side, a center interval $(T_{12c})$ of the first lens and the second lens satisfies $T_{12c}$<0.2 mm, and an outermost interval $(T_{12e})$ of an effective diameter of the first lens and the second lens satisfies $T_{12e}$<0.2 mm;

the third lens (L3) has a negative refractive power;

the fourth lens (L4) has a negative refractive power, a front surface of the fourth lens is concave toward the focal object side, and a rear surface is convex toward the image side; and the fifth lens (L5) has a positive refractive power, a front surface of the fifth lens is convex toward the focal object side, a curvature of a rear surface (C10) satisfies −0.01<C10<0.01, and a periphery of the rear surface is convex toward the image side, wherein a center interval ($T_{45c}$) of the fourth lens and the fifth lens satisfies $T_{45c}$<0.1 mm, and an outermost interval (T45e) of an effective diameter of the fourth lens and the fifth lens satisfies T45e>0.35 mm, and a value of thickness (ct1) of the first lens (L1), a thickness (ct2) of the second lens (L2), a thickness (ct3) of the third lens (L3), a thickness (ct4) of the fourth lens (L4), and a thickness (ct5) of the fifth lens (L5), and a distance (TL) from the front surface of the first lens (L1) to the rear surface of the fifth lens (L5) satisfies (ct1+ct2+ct3+ct4+ct5)/TL<0.47.

9. The small lens system of claim 8, wherein the third lens is biconcave.

10. The small lens system of claim 8, wherein a distance (T47) from the rear surface of the second lens to the front surface of the fourth lens satisfies T47>2.5 mm.

11. The small lens system of claim 8, wherein an effective focal length (f) of the lens system and a distance (TTL) from a front surface of the lens system to the image surface satisfies TTL/f<0.85.

12. The small lens system of claim 8, wherein an angle of view (VA) satisfies 26 degrees<VA<32 degrees.

13. The small lens system of claim 8, wherein a composite focal length (f12) of the first lens (L1) and the second lens (L2), and a composite focal length (f345) of the third lens (L3), the fourth lens (L4), and the fifth lens (L5) satisfy 0.8<|f12/f345|<1.2.

14. The small lens system of claim 8, wherein an Abbe number (V1) of the first lens (L1), an Abbe number (V2) of the second lens (L2), an Abbe number (V3) of the third lens (L3), an Abbe number (V4) of (L4) of the fourth lens, and an Abbe number (V5) of the fifth lens (L5) respectively satisfy 50<V1<60, 15<V2<30, 50<V3<60, 50<V4<60, and 15<V5<30.

15. The small lens system of claim 8, wherein all of the first to fifth lenses are made of a plastic material and all surfaces are aspherical.

* * * * *